United States Patent [19]
Kanazawa et al.

[11] Patent Number: 5,739,623
[45] Date of Patent: Apr. 14, 1998

[54] VIBRATION WAVE DRIVEN MOTOR

[75] Inventors: Hajime Kanazawa, Tama; Tetsuya Nishio, Kawasaki; Kazuki Fujimoto, Kawasaki; Kazuyuki Omori, Kawasaki, all of Japan

[73] Assignee: Canon Kabushiki Kaisha, Tokyo, Japan

[21] Appl. No.: 494,261

[22] Filed: Jun. 23, 1995

Related U.S. Application Data

[63] Continuation of Ser. No. 129,323, Sep. 30, 1993, abandoned.

[30] Foreign Application Priority Data

Oct. 1, 1992 [JP] Japan ............... 4-263622

[51] Int. Cl.$^6$ ............... H01L 41/08
[52] U.S. Cl. ............... 310/323; 310/325
[58] Field of Search ............... 310/323, 328

[56] References Cited

U.S. PATENT DOCUMENTS

| | | | |
|---|---|---|---|
| 4,642,509 | 2/1987 | Kumada | 310/323 |
| 4,831,305 | 5/1989 | Mukohjima et al. | 310/323 |
| 4,959,579 | 9/1990 | Kuwabara et al. | 310/323 |
| 4,965,482 | 10/1990 | Ohnishi et al. | 310/323 |
| 5,051,647 | 9/1991 | Uchikawa et al. | 310/323 |
| 5,091,670 | 2/1992 | Kawata et al. | 310/323 |
| 5,115,161 | 5/1992 | Myohga et al. | 310/323 |
| 5,216,314 | 6/1993 | Suzuki | 310/323 |
| 5,231,325 | 7/1993 | Tamai et al. | 310/323 |
| 5,352,949 | 10/1994 | Eguchi et al. | 310/323 |
| 5,387,835 | 2/1995 | Tsukimoto et al. | 310/323 |
| 5,428,260 | 6/1995 | Suzuki | 310/323 |

FOREIGN PATENT DOCUMENTS

| | | | |
|---|---|---|---|
| 0469883 | 2/1992 | European Pat. Off. | 310/323 |

*Primary Examiner*—Mark O. Budd
*Attorney, Agent, or Firm*—Fitzpatrick, Cella, Harper & Scinto

[57] ABSTRACT

A vibration wave driven motor including a stator, a rotor, and an urging member for causing the stator and the rotor to contact each other under pressure. The urging member is supported by a supporting member at a predetermined position. The supporting member is shiftable in the urging direction of the urging member.

20 Claims, 17 Drawing Sheets

5,739,623

1

VIBRATION WAVE DRIVEN MOTOR

This application is a continuation of application Ser. No. 08/129,323 filed Sep. 30, 1993, now abandoned

BACKGROUND OF THE INVENTION

1. Field of the Invention

The present invention relates to an ultrasonic wave driven motor or a vibration wave driven motor using an ultrasonic wave vibration.

2. Related Background Art

Conventionally, there is proposed an ultrasonic wave driven motor, which forms vibrations in two bending modes in a vibrating member formed into a bar shape, by applying an AC voltage to a piezoelectric element provided on the vibrating member, causes surface portions on a driving surface to perform an elliptic motion by synthesizing the two vibrations, and frictionally drives a movable member which contacts the driving surface under pressure, thereby obtaining a rotational force.

The ultrasonic wave driven motor has an arrangement as shown in the sectional view in FIG. 2.

More specifically, a vibrating member V is constituted by a metal vibration applying member 1, piezoelectric elements 3-A and 3-B each of which including a pair of piezoelectric elements, electrode plates 2-A, 2-B, and 2-G, a metal pressing member 4, and a bolt 5. An end face 1-a of the vibration applying member 1 serves as a frictional sliding portion, and one point on the frictional sliding portion vibrates in the direction of an arrow in FIG. 2, i.e., in a direction inclined at about 45° from the sliding portion. When viewed from the axial direction of the vibrating member V, the vibration of the point forms a circular motion, and gives a rotational motion to a rotor 7 which contacts the frictional sliding portion via a contact portion 7-a.

A recessed portion 1-b of the vibration applying member 1 amplifies a displacement of the frictional sliding portion.

A portion 7-b of the rotor 7 is formed into a shape which reduces a friction loss in such a manner that the deformation direction of the contact portion 7-a upon application of a vibration force from the vibration applying member 1 coincides with the vibration direction of the vibration applying member 1, as indicated by an arrow in FIG. 2.

FIG. 3 is an exploded perspective view of the vibrating member V of the ultrasonic wave driven motor.

In the piezoelectric elements 3-A and 3-B, the directions of polarization are reversed in a pair of piezoelectric elements using the central axes of the elements as boundary lines 3-A-a and 3-B-a. One pair of piezoelectric elements 3-A (to be referred to as A-phase piezoelectric elements hereinafter) are arranged so that portions thereof having the same directions of polarization oppose each other to sandwich the electrode plate 2-A therebetween, as shown in FIG. 3. Similarly, the other pair of piezoelectric elements 3-B (to be referred to as B-phase piezoelectric elements hereinafter) are arranged so that portions thereof having the same directions of polarization oppose each other to sandwich the electrode plate 2-B therebetween, as shown in FIG. 3. The pairs of A-and B-phase piezoelectric elements are arranged to be positionally shifted from each other through 90°, and to sandwich the electrode plate 2-G therebetween, as shown in FIG. 3. The four piezoelectric elements and the electrode plates, which are arranged as described above, are inserted between the vibration applying member 1 and the pressing member 4, and are fastened and fixed there between by the bolt 5 (see, e.g., FIG. 1).

2

When AC voltages $V_A$ and $V_B$ shown in FIG. 4 are respectively applied to the electrode plates 2-A and 2-B of the vibrating member V with the above-mentioned arrangement, a travelling vibration in a bending mode as an oscillating vibration is generated in the vibrating member, as shown in FIG. 5, by vibrations generated by the A-and B-phase piezoelectric elements. In particular, when the frequencies of the AC voltages shown in FIG. 4 are set to coincide with the resonance frequency of the vibration mode shown in FIG. 5, the vibration of the vibrating member is maximized, and the rotational speed of the rotor 7 is also maximized.

Referring back to FIG. 2, the vibrating member V constituted by the vibration applying member 1, the electrode plates 2, the piezoelectric elements 3, the pressing member 4, and the bolt 5 is adhered and fixed to a fixing member 10 at an anti-rotation portion 5-b of bolt 5. Therefore, the bolt 5 and the fixing member 10 support the vibrating member.

A resin spring case 6 is integrally adhered to the rotor 7.

The rotor 7 is axially supported by a shaft portion 5-c of bolt 5 at a portion 6-a of the spring case 6. The portion 6-a of the spring case 6 has an annular shape, as shown in FIG. 2, and can be freely inclined from the shaft portion 5-c of the bolt 5 to have the portion 6-a act as a fulcrum.

An output gear 8 is axially supported by a shaft portion 5-d of bolt 5 via a bearing 9.

A compression spring 11 is located at a position shown in FIG. 2 between the output gear 8 and the spring case 6, and presses the rotor 7 against the vibration applying member 1. The output gear 8 and the rotor 7 form anti-rotation engaging portions at a portion A, and the rotational force of the rotor 7 is transmitted to the output gear via the engaging portions of the portion A.

Note that the engaging portions of the portion A are formed so that the rotor 7 and the gear 8 are movable with cluttering in the radial and thrust directions.

In the conventional ultrasonic wave driven motor described above, in order to obtain a stable, high output, the rotor 7 must be uniformly pressed against the vibrating member with a predetermined pressure. More specifically, for example, the ultrasonic wave driven motor preferably has a structure in which the following conditions do not influence the pressure force of the rotor, and the rotor is uniformly pressed at a predetermined pressure to follow the vibrating member in any event:

(1) the output gear 8 in FIG. 2 receives a force (side pressure) in the radial direction generated when the output gear 8 transmits an output to a transmission gear (not shown) for driving, e.g., a lens;

(2) a portion for axially supporting the rotor 7 is inclined;

(3) the contact surface between the rotor and the vibration member is not truly perpendicular to the thrust direction;

(4) torque counterforces of a plurality of anti-rotation engaging portions (portion A) for transmitting the rotational force of the rotor are not uniform, and as a result, a force (side pressure) in the radial direction acts on the rotor in a plane including the portion A and perpendicular to the thrust direction; and (5) the compression spring has poor precision, and its pressure force is not uniform in the circumferential direction.

When the above-mentioned prior art is viewed from such a viewpoint, it is noted that the output gear 8 is axially supported by the shaft portion 5-d of the bolt via the bearing 9. Therefore, the force (side pressure) in the radial direction, which force acts on the output gear 8 upon transmission of an output to a transmission gear (not shown) is transmitted to the shaft portion 5-d of the bolt via the bearing 9, and does not influence the pressure force of the compression spring 11.

Therefore, the rotor 7 is correctly pressed against the vibration applying member 1 without being influenced by the side pressure of the output gear 8.

The rotor 7 is axially supported by the shaft portion 5-c of the bolt 5 at the portion 6-a of the spring case 6. The axially supported portion is present at the proximal part of a pin portion 5-a of the bolt, and is substantially flat with the contact surface between the rotor 7 and the vibration applying member 1. Since the portion 6-a of the spring case 6 can be freely inclined with respect to the shaft portion 5-c of the bolt 5, even when the pin portion 5-a is bent, the rotor 7 is inclined with respect to the vibration applying member 1, and is in correct contact with it without being eccentric from it. Also, even when the contact surface between the rotor and the stator is not truly perpendicular to the thrust direction, the rotor is correctly compressed to follow the stator.

Then, the rotational force of the rotor 7 is transmitted to the output gear 8 via the engaging portions of the portion A.

The engaging portions of the portion A are substantially flat with the portion 6-a of the spring case 6, which portion axially supports the rotor 7, as shown in FIG. 2. Therefore, since the side pressure to the rotor generated when torque counterforces of the plurality of anti-rotation portions (portion A) are nonuniform is received by the shaft portion 5-c of the bolt, it does not influence the pressure force of the rotor to the stator.

However, when the compression spring 11 has poor precision, and its pressure force is not uniform in the circumferential direction, the pressure force nonuniformity of the compression spring is almost exactly converted into a pressure force nonuniformity of the contact portion of the rotor in the prior art. As a result, a stable, high output cannot be obtained.

SUMMARY OF THE INVENTION

It is an object of the present invention to provide an ultrasonic wave driven motor, which provides a uniform a pressure force at a contact surface between a rotor and a stator even when the compression spring has poor precision and suffers from pressure force nonuniformity, and can stably generate a high output.

Other objects of the present invention will become apparent from the following detailed description of the present invention.

According to one aspect of the present invention, there is provided a vibration wave driven device wherein at least one of supporting members for supporting an urging member for applying a pressure force between a stator and a rotor is arranged to be movable in an urging direction of the urging member.

According to another aspect of the present invention, a vibrating member has a hollow shape, and a bolt for supporting the vibrating member at a predetermined position is arranged in the hollow portion of the vibrating member. The vibrating member contacts a rotor at a predetermined pressure by an urging member. The urging member is supported by a supporting member which can be shifted in the longitudinal direction of the bolt.

DESCRIPTION OF THE PREFERRED EMBODIMENTS

<First Embodiment>

Figure 1:
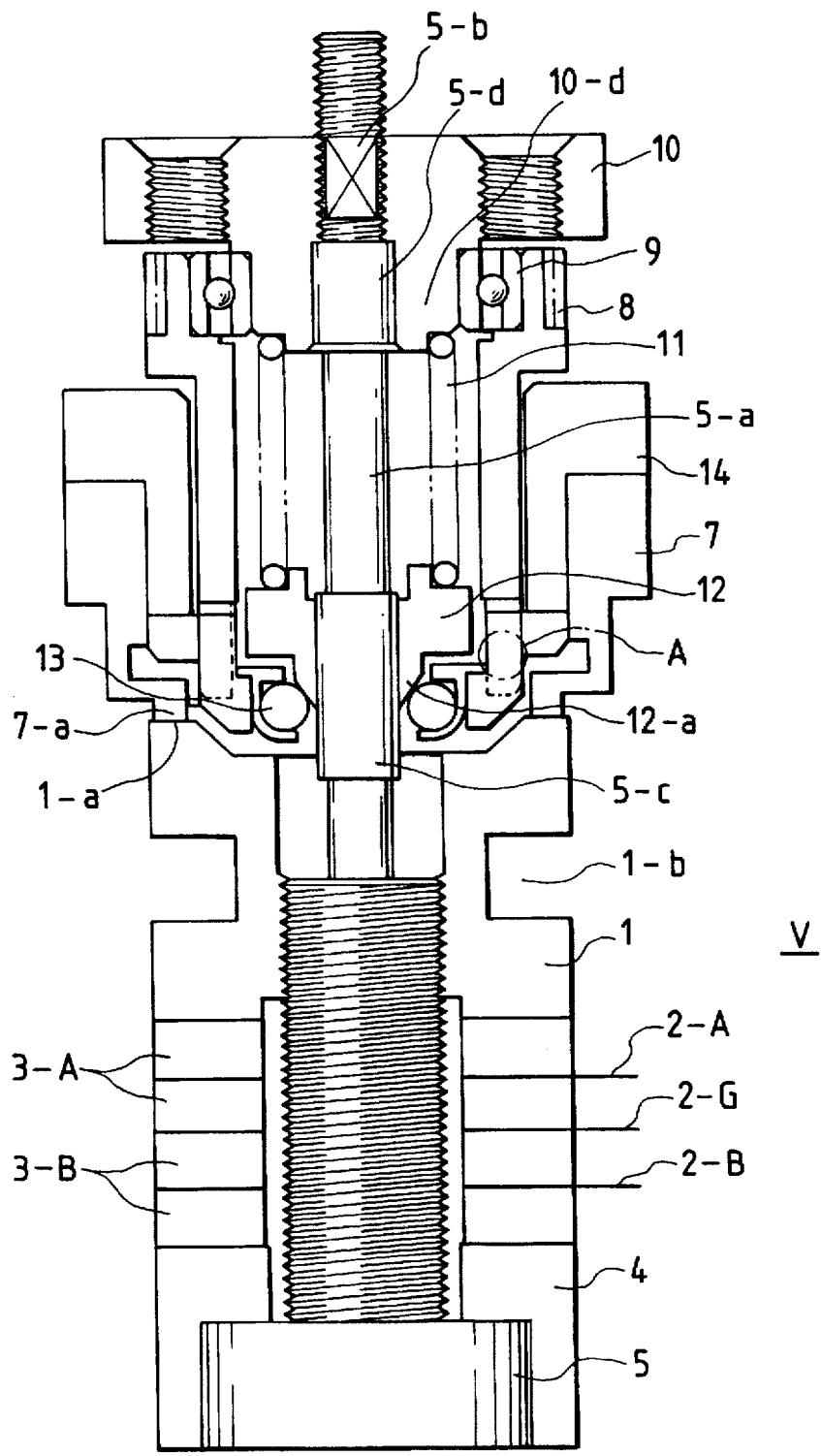
FIG. 1 is a longitudinal sectional view showing a first embodiment of the present invention.

FIG. 1 shows the first embodiment of an ultrasonic wave driven motor according to the present invention.

Figure 2:
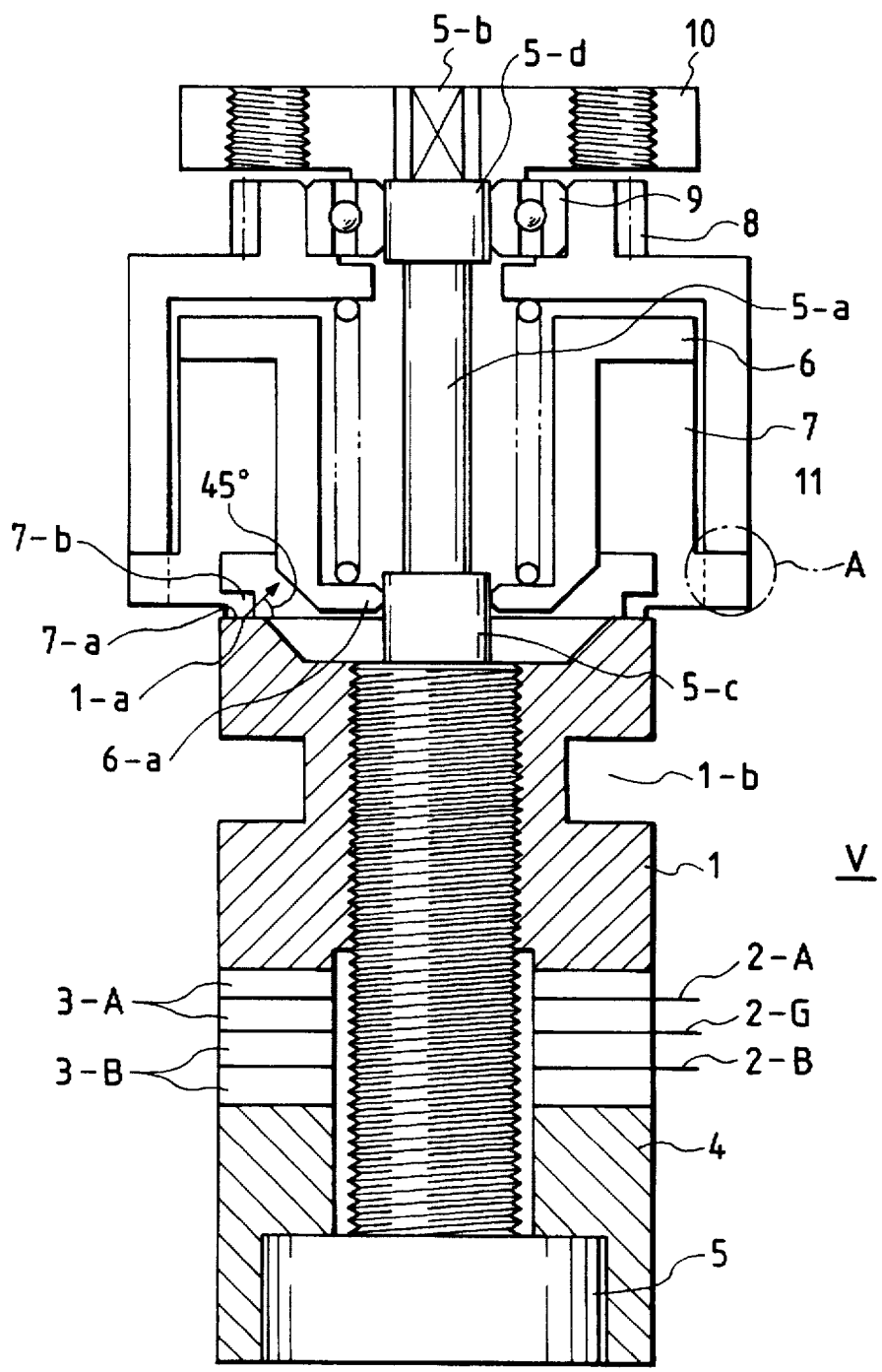
FIG. 2 is a longitudinal sectional view showing a conventional ultrasonic wave driven motor.
Figure 3:
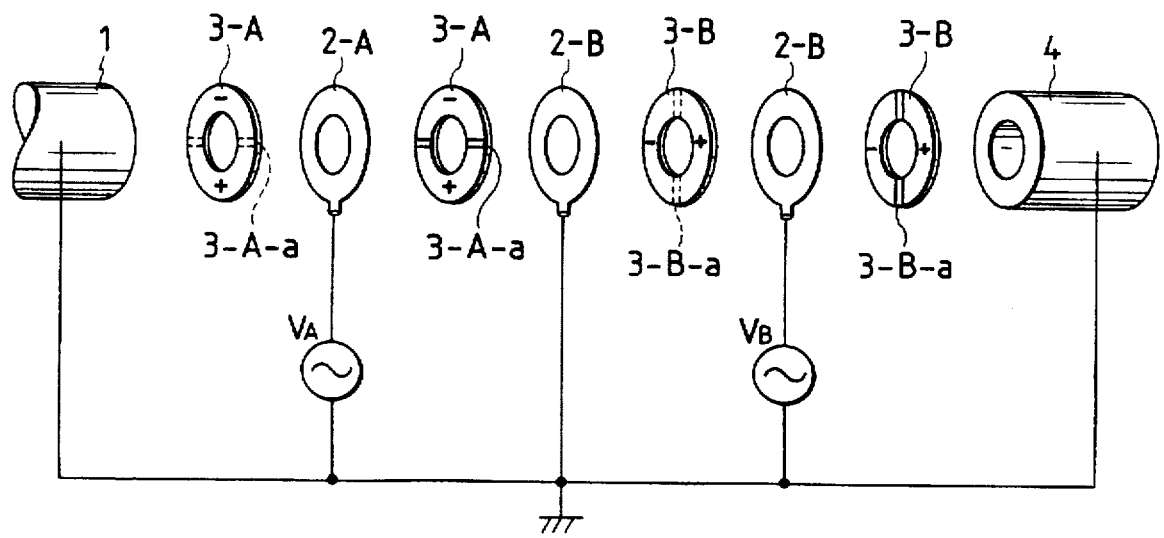
FIG. 3 is an exploded perspective view of a vibrating member.
Figure 4:
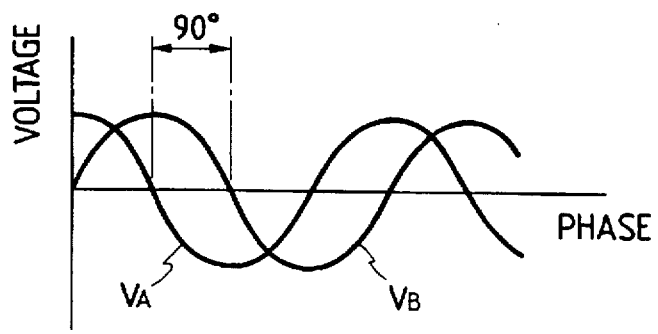
FIG. 4 is a waveform chart of voltages to be applied to the ultrasonic wave driven motor.
Figure 5:
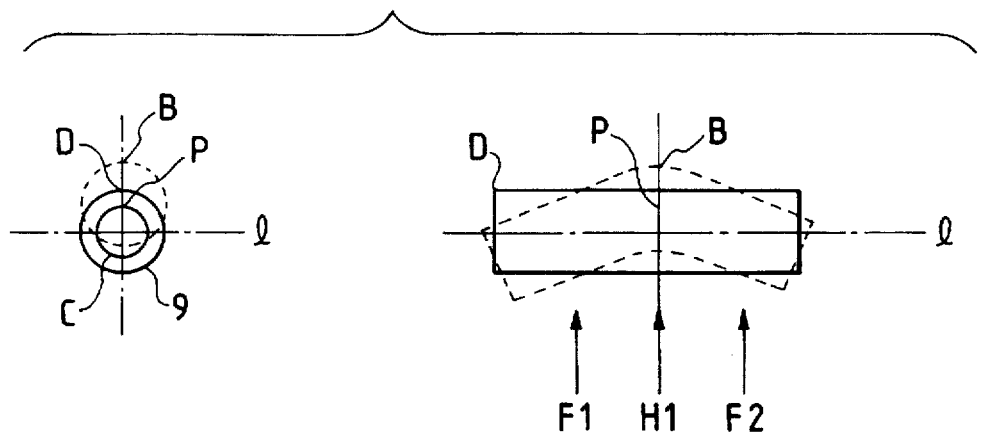
FIG. 5 is a view showing a vibration mode of the vibrating member.

An ultrasonic vibration driven motor shown in FIG. 1 has substantially the same arrangement as that of the prior art shown in FIG. 2 except that it also includes a slide member 12, a pivot bearing 13, and a rotor output transmission member 14. The slide member 12 is slidable along the longitudinal direction of a bolt 5, and contacts the end portion of a compression spring 11 to support the spring 11.

In the following description, portions different from the prior art will be mainly explained. Note that members which will not be described in the following description have the same functions as in the prior art.

One end face of the compression spring 11 contacts a fixing member 10, and the other end face thereof contacts the slide member 12. The inner-diameter side of the hollow slide member 12 contacts a bolt shaft portion 5-c, and the contact portion between these portions is applied with, e.g., grease. Therefore, the slide member 12 is movable in only the thrust direction. The pivot bearing 13 and the rotor output transmission member 14, and the rotor output transmission member 14 and the rotor 7 are respectively integrated by press fitting or adhesion. A distal end portion 12-a of the slide member 12 is tapered, and contacts a ball of the pivot bearing 13. The pressure force of the compression spring presses a rotor 7 against a vibrating member via the slide member 12, the pivot bearing 13, and the rotor output transmission member 14. The rotor 7 is rotated by a travelling vibration in a bending mode generated in the vibrating member. At this time, the rotor 7, the rotor output transmission member 14, and the outer frame of the pivot bearing 13 integrally rotate. The rotor output transmission member 14 and an output gear 8 include cooperating anti-rotation portions at a portion A, and the rotational force of the rotor 7 is transmitted to the output gear via the portion A. A plurality of anti-rotation portions are formed on the same circumference. Note that the rotor output transmission member 14 and the output gear 8 are freely movable with cluttering in the radial and thrust directions.

In the following description, it will be shown that the ultrasonic wave driven motor of this embodiment with the above-mentioned arrangement has a structure in which the following conditions do not influence the pressure force of the rotor, and the rotor is uniformly pressed at a predetermined pressure to follow the vibrating member:

(1) the output gear receives a force (side pressure) in the radial direction generated when it transmits an output to a transmission gear (not shown);

(2) the portion for axially supporting the rotor is not truly parallel to the thrust direction, but is slightly inclined;

(3) the contact surface between the rotor and the vibrating member is not truly perpendicular to the thrust direction;

(4) torque counterforces of the plurality of anti-rotation portions for transmitting the rotational force of the rotor are not uniform, and as a result, a force (side pressure) in the radial direction acts on the rotor in a plane including the portion A and perpendicular to the thrust direction; and (5) the compression spring has poor precision, and the pressure force is not uniform in the circumferential direction.

The output gear 8 is axially supported by a step portion 10-d of the fixing member 10 via a bearing 9 at the side of the fixing member 10. Therefore, the force (side pressure) in the radial direction, which force acts on the output gear 8 upon transmission of its output to a transmission gear (not shown), is transmitted to the step portion 10-d of the fixing member 10 via the bearing 9, and does not influence the pressure force of the compression spring 11.

The rotor 7 is axially supported by the shaft portion 5-c of the bolt 5 via the rotor output transmission member 14, the pivot bearing 13, and the slide member 12. The pivot bearing 13 and its shaft easily accommodate any angular deviation, and the angular deviation allows the rotor to be tiltable. The tilt absorbs the slight inclination of the shaft portion 5-c of the bolt 5, and a deviation of the contact surface between the rotor and the vibrating member from a plane which is perpendicular to the thrust direction.

Since the rotor output transmission member 14 and the output gear 8 are freely rotatable with cluttering in the radial and thrust directions at the anti-rotation portions (portion A), the rotor 7 can follow the vibrating member even when the shaft portion 5-c of the bolt 5 is slightly inclined or the contact surface between the rotor 7 and the vibrating member is not truly perpendicular to the thrust direction.

The torque counterforces of the plurality of anti-rotation portions (portion A) for transmitting the rotational force of the rotor are not uniform, and as a result, a radial force (side pressure) acts on the rotor in a plane including portion A and perpendicular to the thrust direction. However, as described above, since the rotor is axially supported by the shaft portion 5-c of the bolt 5, and is axially supported almost in a plane including portion A and perpendicular to the thrust direction, the side pressure is received by the shaft portion 5-c of bolt 5, and does not influence the pressure force of the rotor on the vibrating member.

Figure 6:
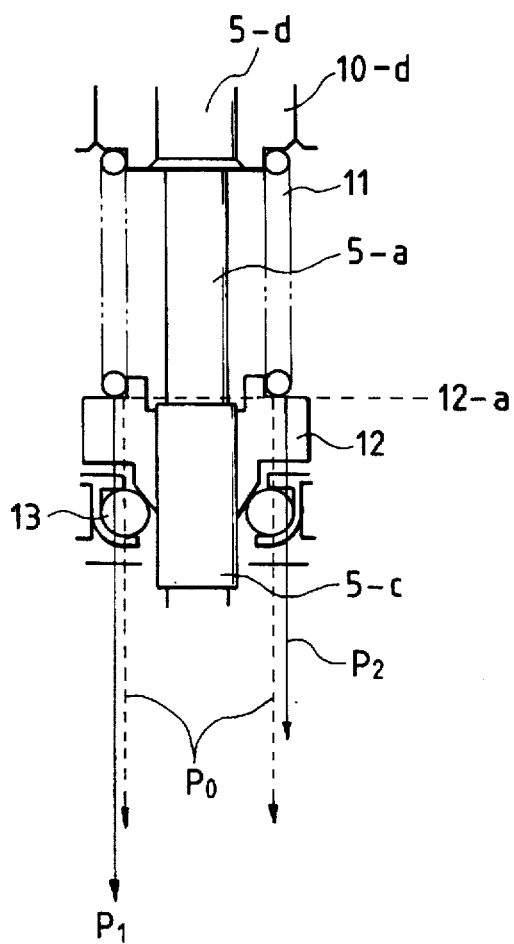
FIG. 6 is a schematic view showing a compression mechanism of the first embodiment.
Figure 7:
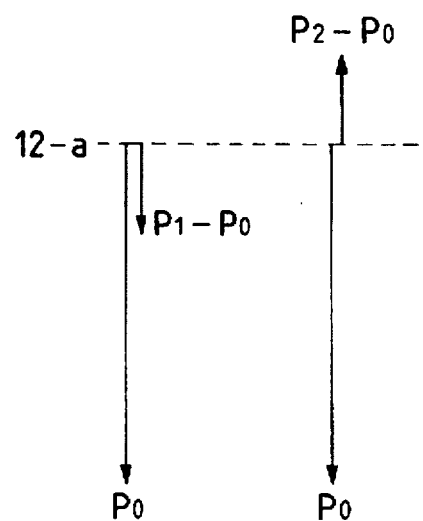
FIG. 7 is a view showing a pressure force acting on a slide member of the first embodiment.

As shown in FIG. 6, assume that the slide member 12 is compressed at a pressure $P_1$ at one position, and is compressed at a pressure $P_2$ at another position due to, e.g., poor working precision of the spring 11, although the slide member 12 should be originally compressed by the spring 11 at a uniform pressure $P_0$ everywhere over its circumference (where $(P_1+P_2)/2=P_0$). The pressures $P_1$ and $P_2$ acting on the end portion 12-a, contacting the compression spring 11, of the slide member 12 can be respectively decomposed to $P_1=P_0+(P_1-P_0)$ and $P_2=P_0+(P_2-P_0)$. $(P_1-P_0)$ and $(P_2-P_0)$ give moments to the end portion 12-a.

Therefore, the fact that the pressures $P_1$ and $P_2$ act is equivalent to the fact that the predetermined pressure force $P_0$ acts, and furthermore, moments $(P_1-P_0)$ and $(P_2-P_0)$ act.

Since the moments $(P_1-P_0)$ and $(P_2-P_0)$ are received by the bolt shaft portion 5-c, it is equivalent to the fact that the slide member 12 is uniformly compressed at the pressure $P_0$ over its circumference.

As described above, in this embodiment, since the rotor 7 follows the vibrating member, and is uniformly compressed at a predetermined pressure, a stable, high output can be obtained.

Note that the bolt shaft portion 5-c slightly vibrates since it is an extended portion of the vibrating member.

Therefore, in order to prevent fretting damage with the slide member 12, a lubricant such as grease is preferably applied to the bolt shaft portion 5-c.

Figure 17:
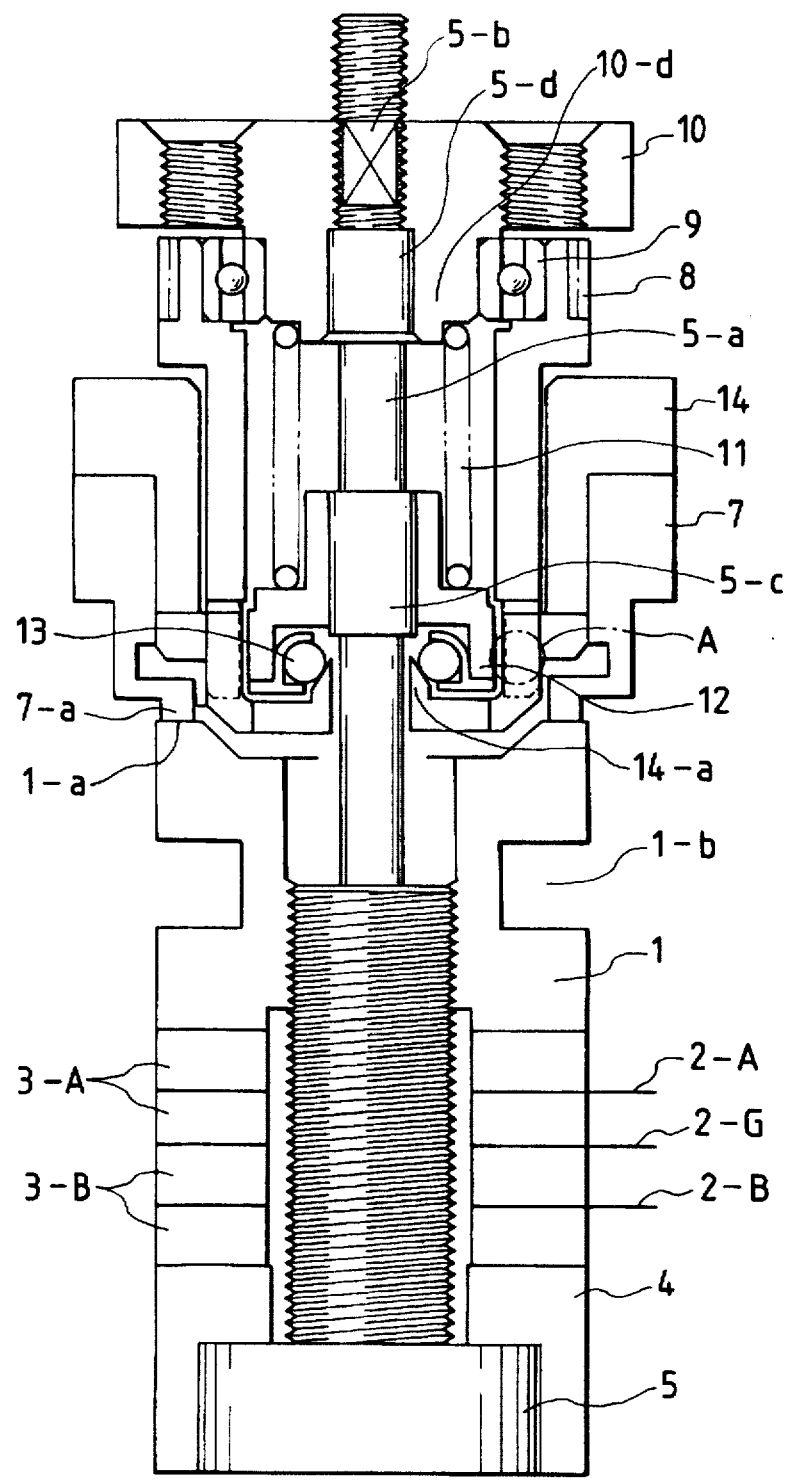
FIG. 17 is a longitudinal sectional view showing a modification of the first embodiment.

As shown in FIG. 17, the pivot bearing 13 may alternatively be integrated to the slide member 12 by press fitting or adhesion, and a central portion 14-a of the rotor output transmission member 14 may be tapered to be in contact with the ball of the pivot bearing 13. Although the rotor is correctly compressed to follow the stator as in FIG. 1, the slide member 12 in FIG. 17 can consist of a resin which does not easily suffer from fretting damage (the slide member 12 in FIG. 1 must consist of a metal since it contacts the ball), thus providing a highly reliable, high-efficiency motor.

In the embodiment shown in FIG. 1, the slide member 12 contacts the bolt shaft portion 5-c to be movable in only the thrust direction. However, the contact portion of the slide member 12 is not limited to the bolt shaft portion. For example, as shown in FIGS. 18, 19, and 20, the slide member may contact the inner-diameter portion of the vibration applying member 1 (see FIG. 18), the inner-diameter portion of the fixing portion 10 (see FIG. 19), or both of them (see FIG. 20) to be movable in only the thrust direction.

Figure 18:
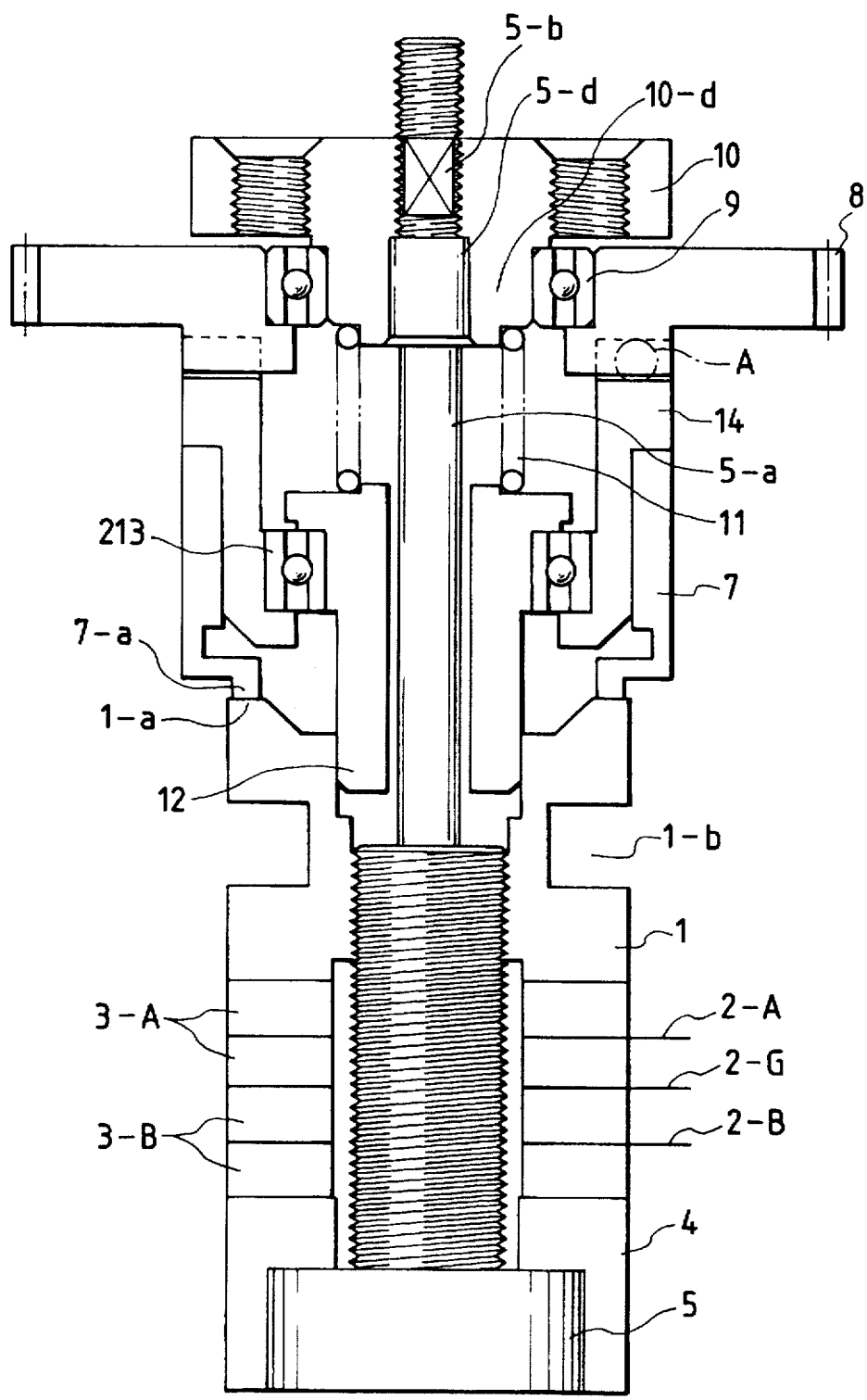
FIG. 18 is a longitudinal sectional view showing another modification of the first embodiment.
Figure 19:
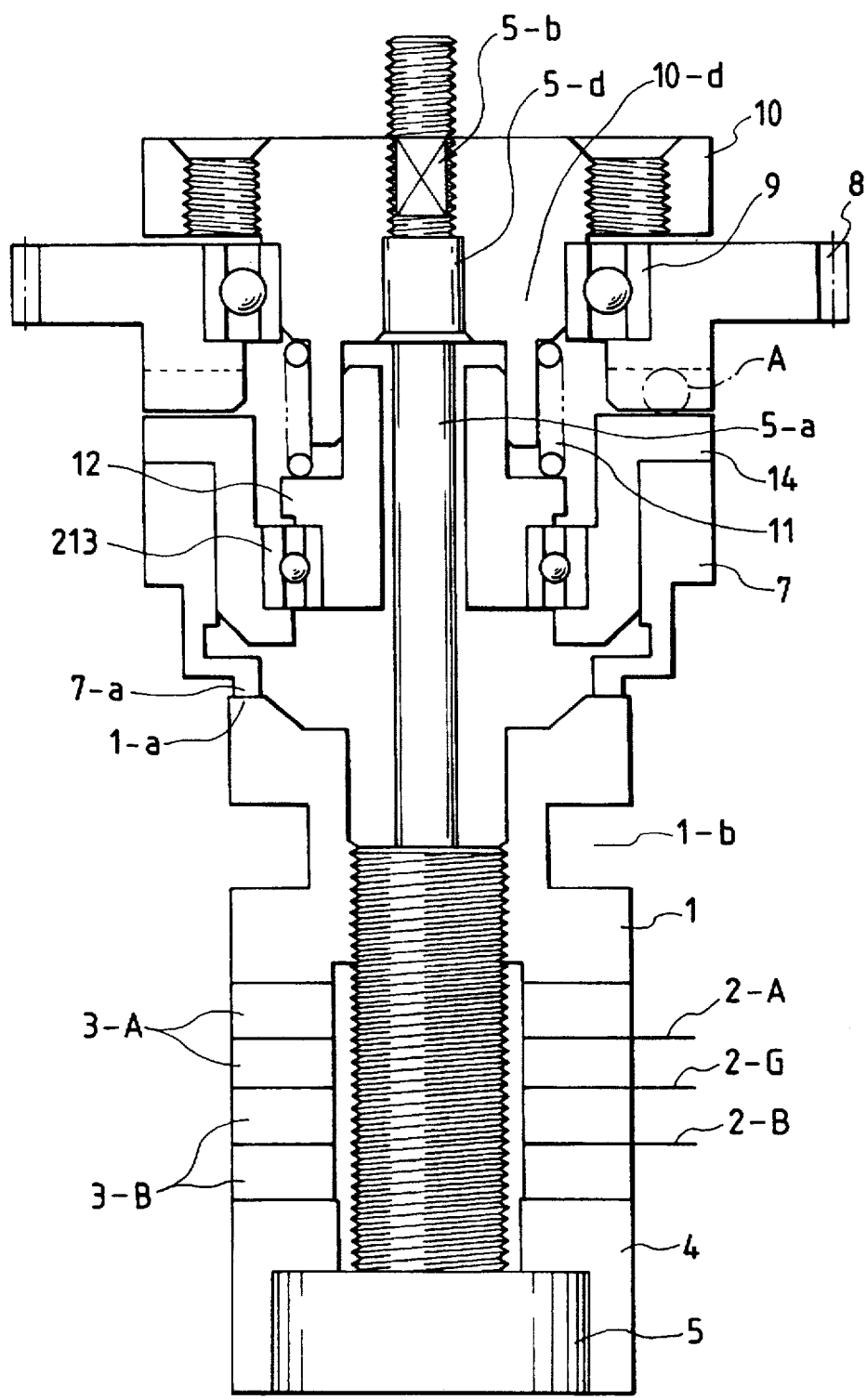
FIG. 19 is a longitudinal sectional view showing still another modification of the first embodiment.
Figure 20:
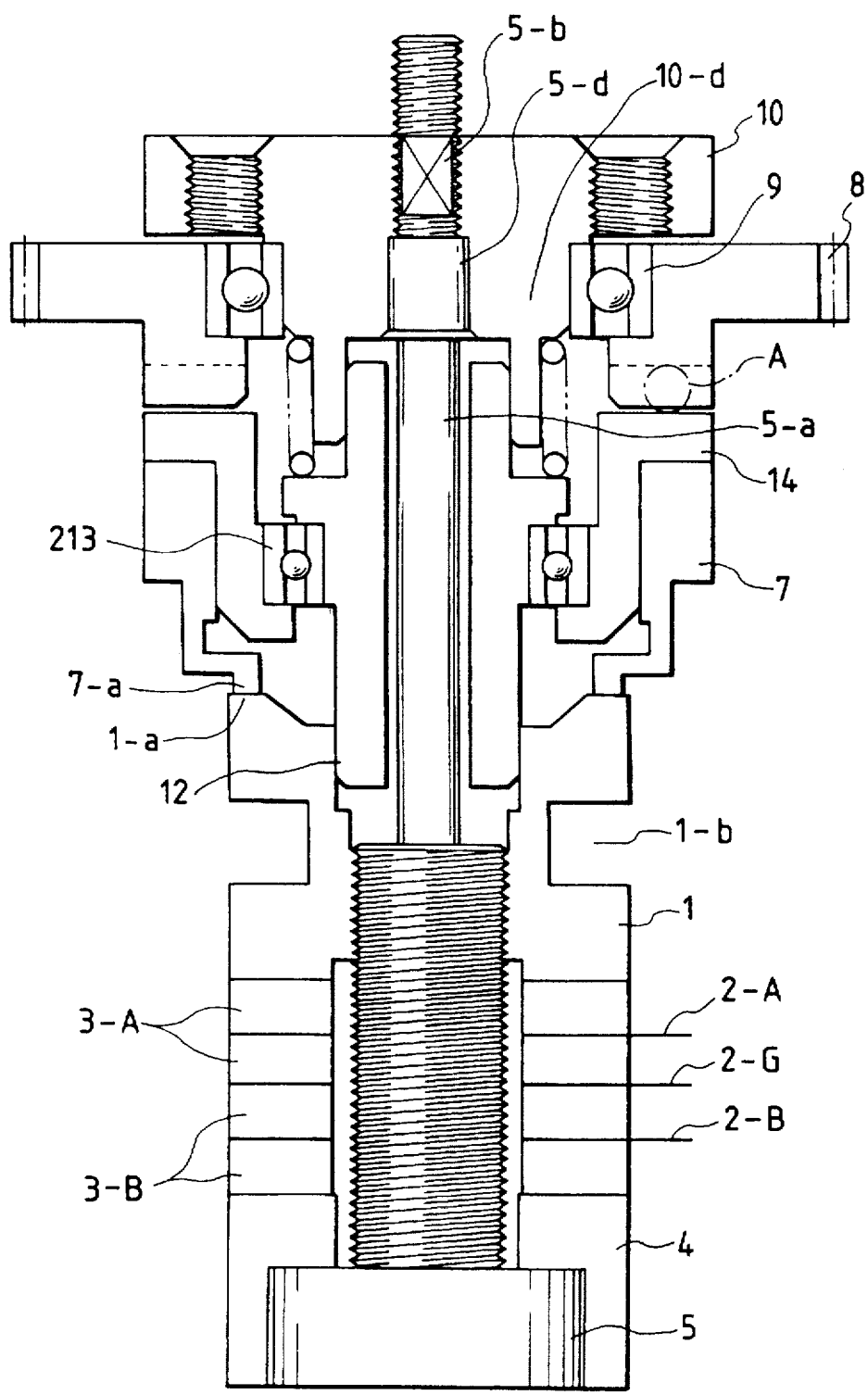
FIG. 20 is a longitudinal sectional view showing still another modification of the first embodiment.

When the components have very high precision, and the tilt need only be small, a radial bearing 213 may be used, as shown in FIGS. 18, 19, and 20, and cluttering of the inner and outer rings of the radial bearing may be utilized for the tilt.

In FIG. 1 or 17, an anti-rotation portion may be formed by chamfering between the slide member 12 and the bolt shaft member 5-c so as to prevent a torsion force from being applied to the compression spring 11.

Figure 21:
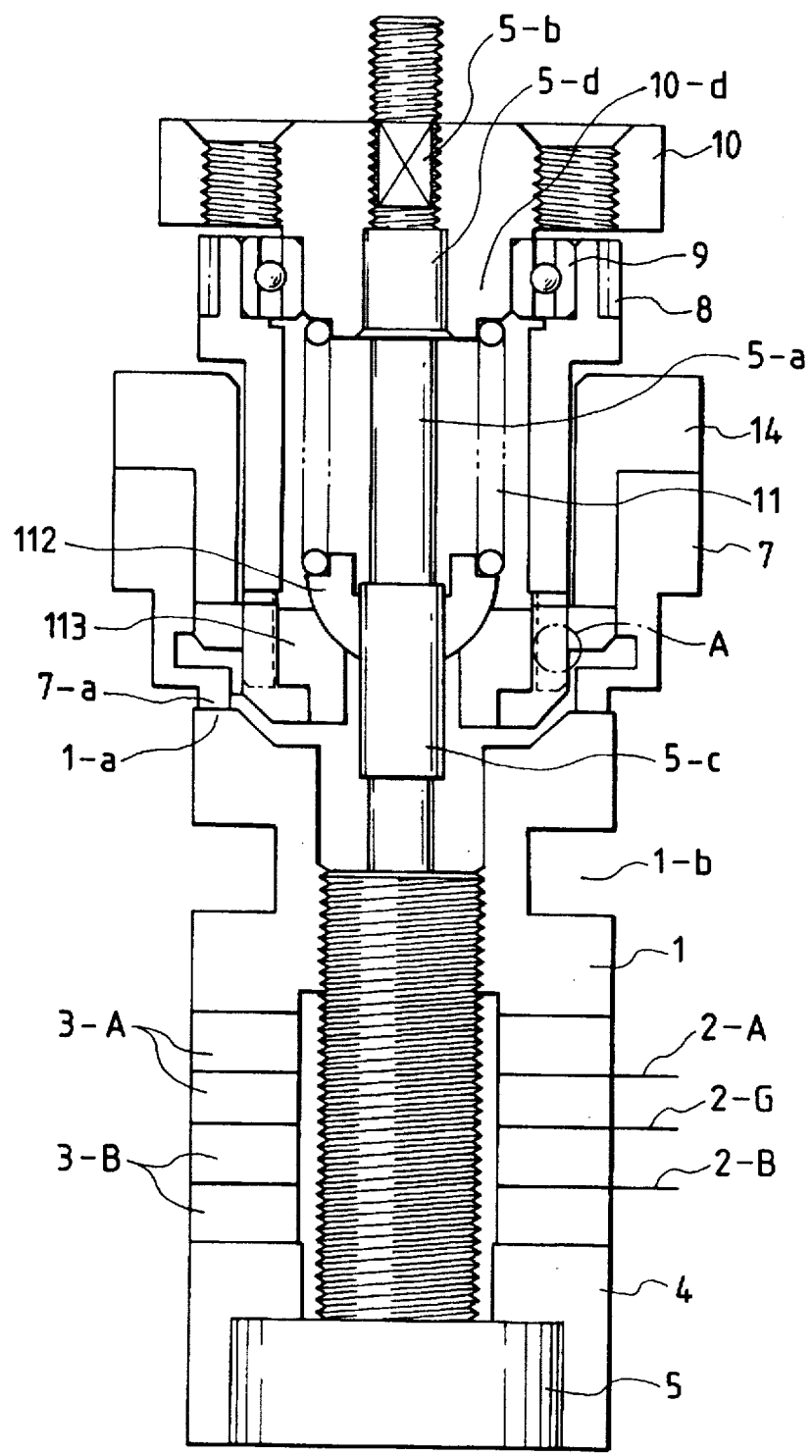
FIG. 21 is a longitudinal sectional view showing still another modification of the first embodiment.

In place of the pivot bearing 13, a spherical bearing may be arranged, as shown in FIG. 21. Referring to Fi. 21, a spherical bearing inner ring 112 also serves as a slide member, and a spherical bearing outer ring 113 is adhered to the rotor output transmission member 14. The inner ring 112 does not rotate, and only the outer ring 113 rotates. With this structure, even when the rotor shaft supporting portion is largely inclined or the plane perpendicular to the thrust direction does not coincide with the contact surface between the rotor and stator, the rotor can be correctly compressed to follow the stator.

In order to decrease a friction loss between the inner and outer rings 112 and 113, it is preferable that a material having a frictional coefficient as small as possible is used, the contact area between the inner and outer rings 112 and 113 is decreased to receive a load near the center of the shaft, or the spherical diameter of the inner ring 112 is set to be slightly smaller than that of the outer ring 113. Also, an anti-rotation portion may be formed by chamfering between the slide member 12 and the bolt shaft member 5-c so as to prevent a torsion force from being applied to the compression spring 11.

<Second Embodiment>

Figure 8:
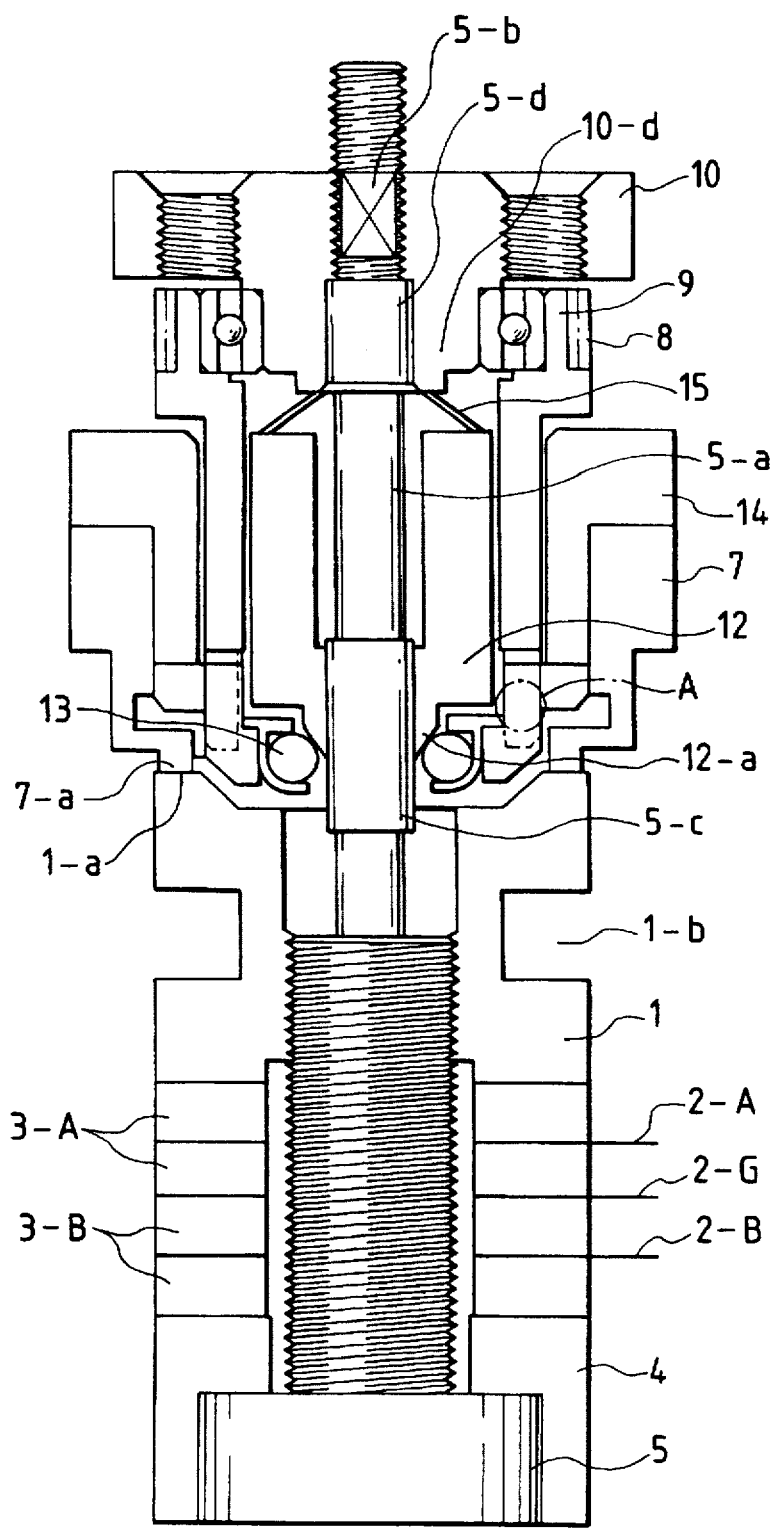
FIG. 8 is a longitudinal sectional view showing a second embodiment of the present invention.

In the first embodiment described above, a coil spring is used as the compression spring. However, other springs may be used. For example, in an embodiment shown in FIG. 8, a belleville spring is used as a compression spring 15.

<Third Embodiment>

Figure 9:
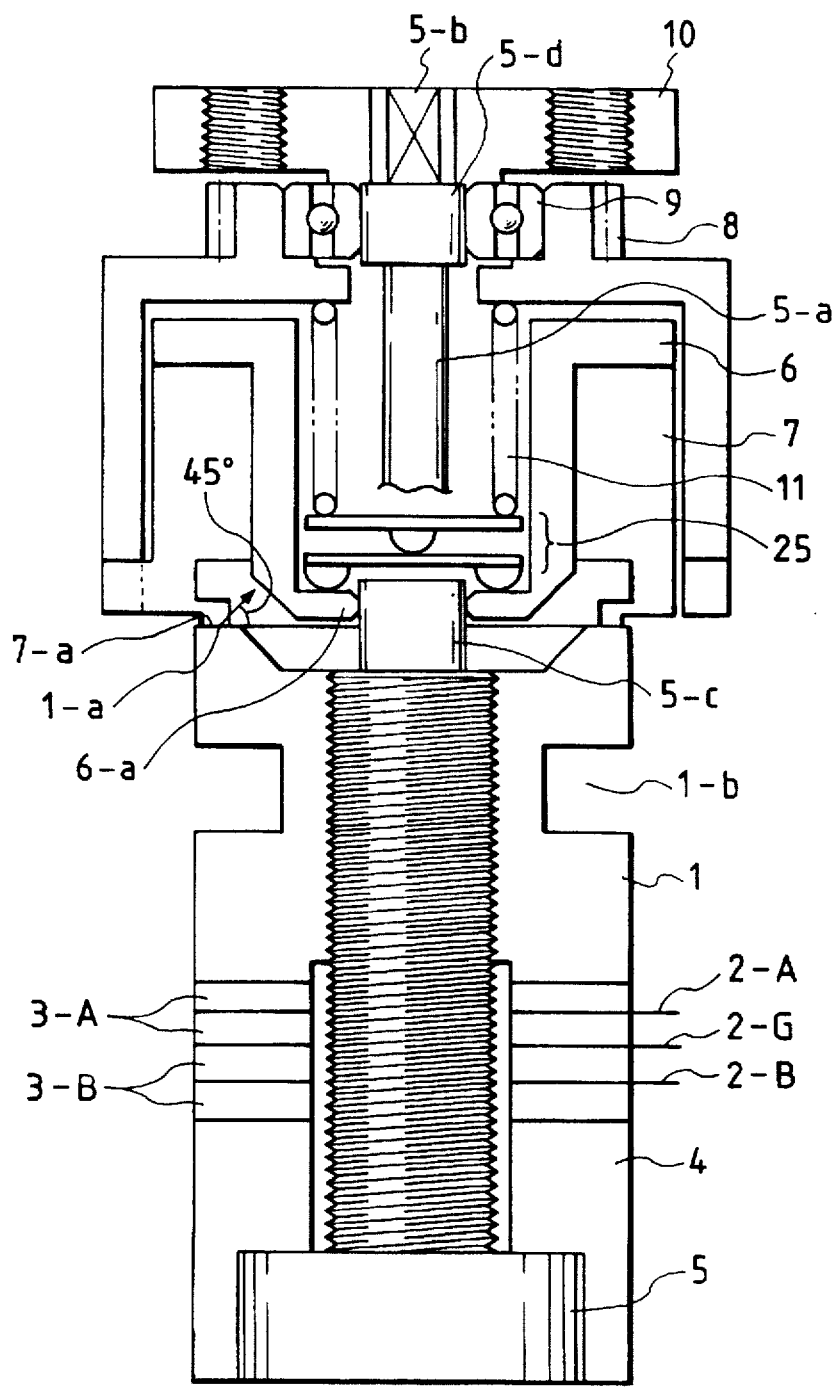
FIG. 9 is a longitudinal sectional view showing a third embodiment of the present invention.
Figure 10:
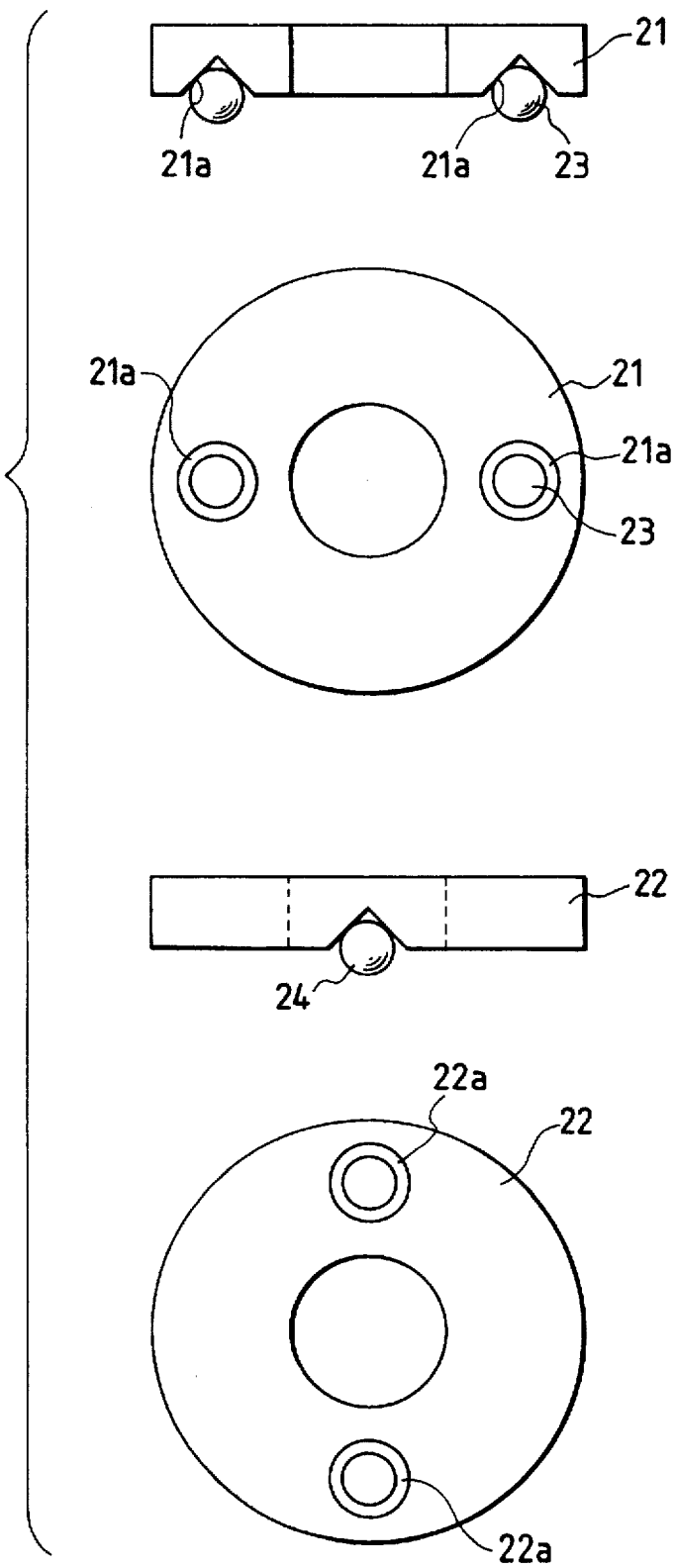
FIG. 10 is a side & plan view showing the details of a compression mechanism of the third embodiment.
Figure 11:
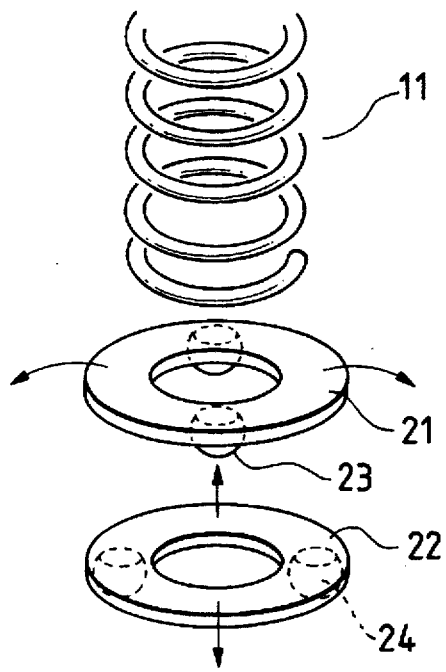
FIG. 11 is a perspective view showing the details of the compression mechanism of the third embodiment.
Figure 12:
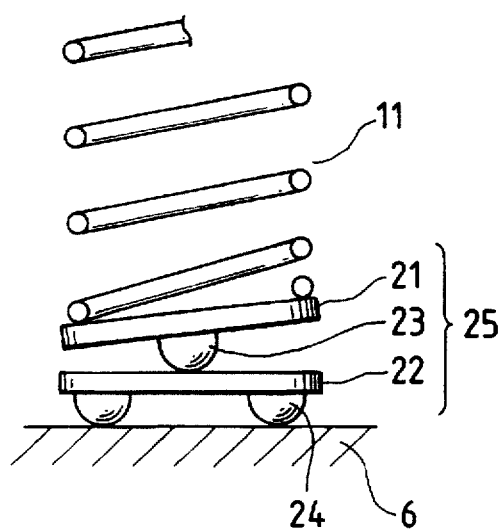
FIG. 12 is a side view showing the details of the compression mechanism of the third embodiment.

FIG. 9 shows the overall structure of an ultrasonic wave driven motor according to a third embodiment, and FIGS. 10 to 12 show the details of the compression mechanism of the motor.

In this embodiment, any nonuniformity in the pressure of the compression spring 11 comprising a compression coil spring is absorbed by a ring-shaped pressure nonuniformity absorbing mechanism 25.

In the nonuniformity absorbing mechanism 25, a pair of rings 21 and 22 each having a central hole portion through which the pin portion 5-a extends are arranged to oppose each other. Two V-shaped holes 21a are formed on the lower portion of one ring 21 in a 180° orientation, and steel balls 23 are adhered and fixed to the two V-shaped holes 21a. V-shaped holes 22a are similarly formed on the lower portion of the other ring 22 so that their phases are shifted by 90° from those of the V-shaped holes 21a of the ring 21. Steel balls 24 are adhered and fixed to these holes 22a.

The steel balls 24 contact a flange 6-a of the spring case 6, the steel balls 23 contact the upper surface of the other ring 22, and the other end of the compression spring contacts one ring 21.

In a nonuniformity absorption mechanism 25 with the above-mentioned arrangement, one ring 21 and the other ring 22 are tiltable to have, as fulcrums, straight lines connecting the steel balls adhered to their lower portions. Since the tilt direction of one ring 21 is shifted by 90° from that of the other ring 22, even when the compression spring 11 suffers from nonuniformity in any direction, the two rings 21 and 22 are properly tilted to absorb the nonuniformity.

FIG. 12 shows the states of the rings 21 and which absorb pressure nonuniformity of the compression spring 11. FIG. 12 exemplifies a case wherein a spring which suffers from nonuniformity in the right-and-left direction with respect to the plane of the drawing is set. More specifically, the nonuniformity absorption mechanism 25 allows transmission of a uniform pressure force to a portion below the spring case 6.

<Fourth Embodiment>

Figure 13:
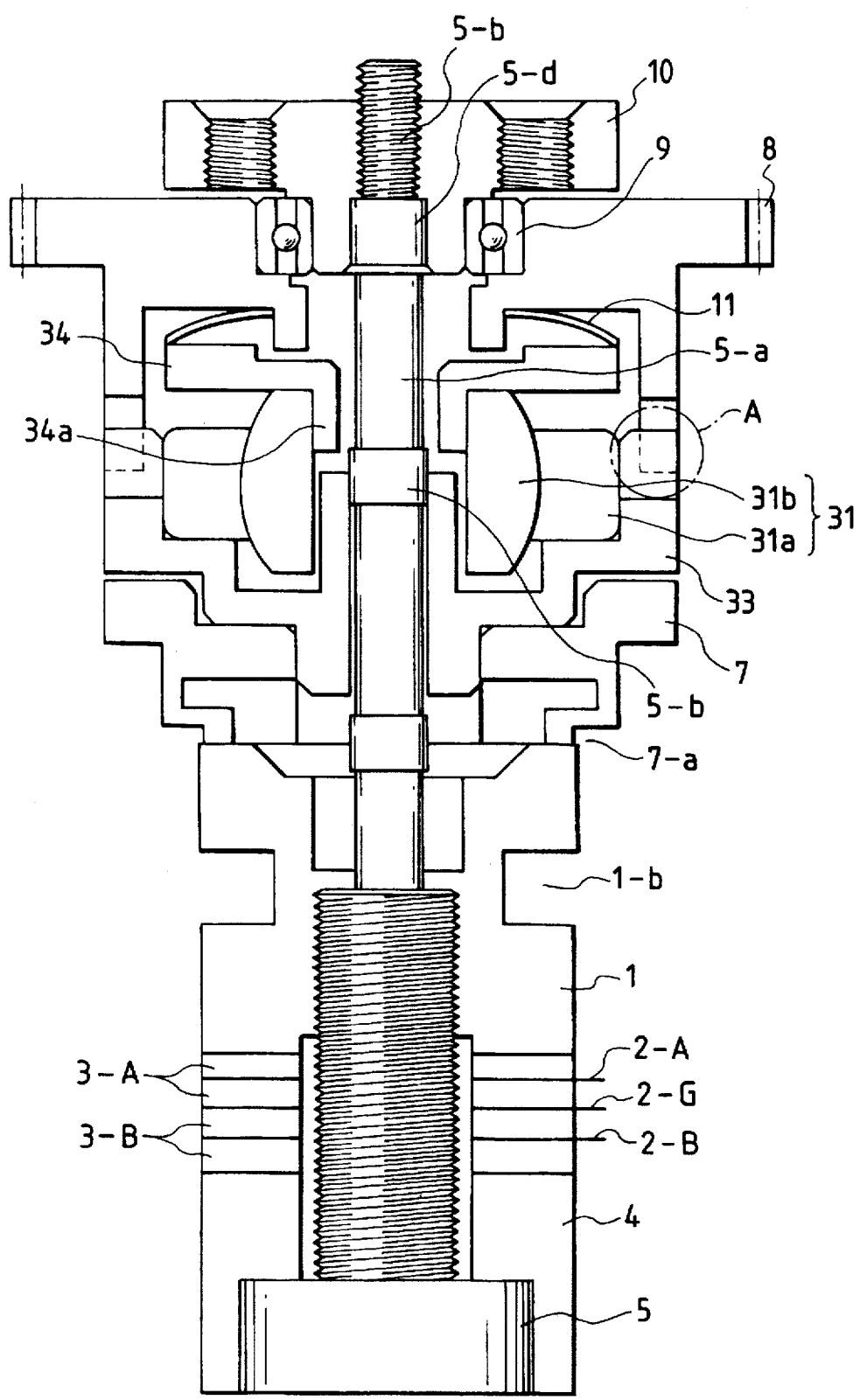
FIG. 13 is a longitudinal sectional view showing a fourth embodiment of the present invention.

FIG. 13 shows a fourth embodiment.

In this embodiment, a spherical bearing 31 (equalizer) comprising a housing 31a and a ball member 31b is used as a means for absorbing pressure nonuniformity.

One end portion of the ball member 31b is fitted on a sleeve 34a of a spring reception portion 34 of a belleville spring 11 as a compression spring, and the housing 31a is fitted in a transmission member 33. The ball member 31b is freely rotatable with respect to the housing 31a, and the spherical bearing 31 is integrally rotated upon rotation of the rotor 7.

Figure 14:
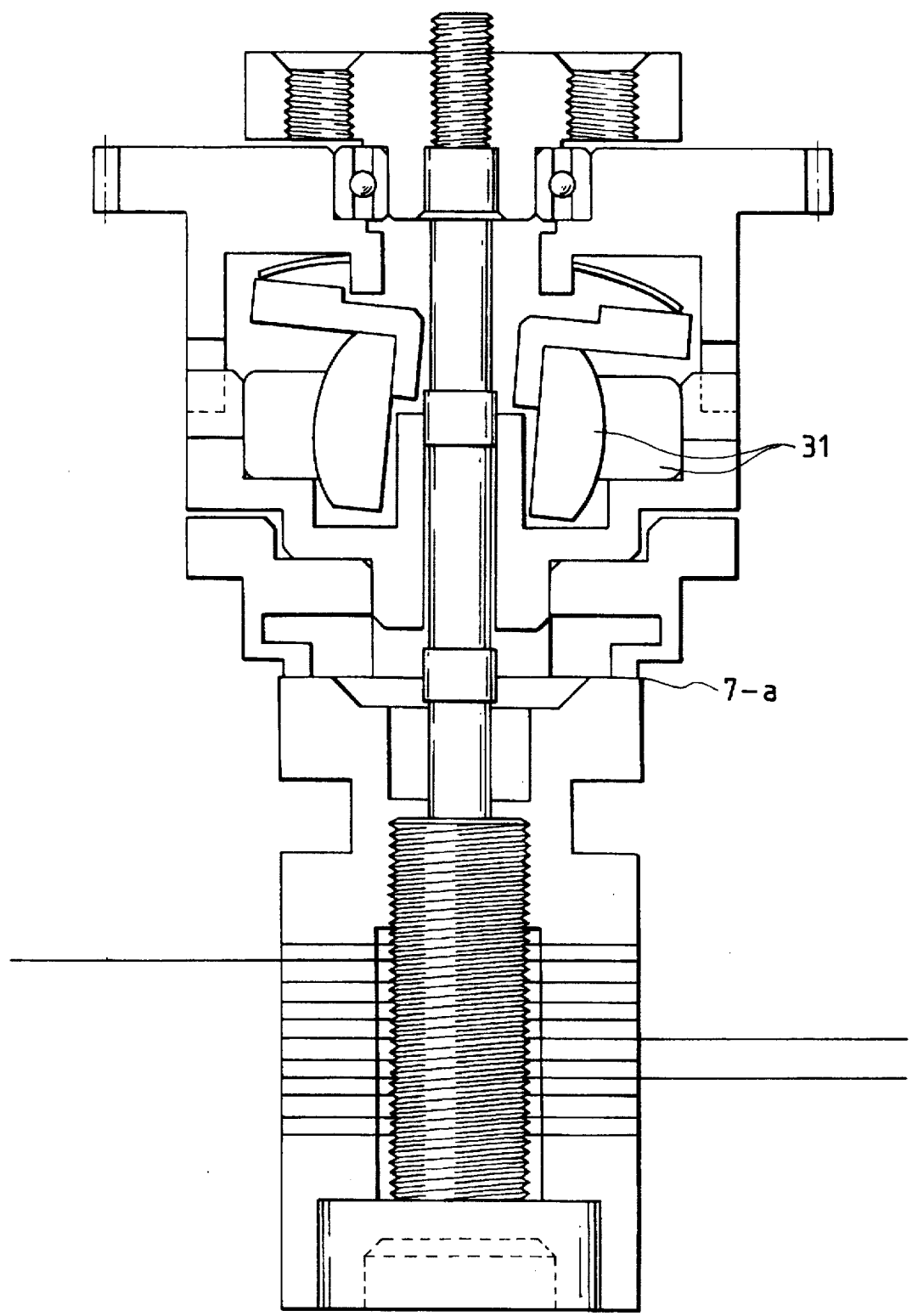
FIG. 14 is a sectional view showing a use state of the fourth embodiment.

More specifically, when the belleville spring 11 suffers from pressure nonuniformity, as shown in FIG. 14, the ball member 31b is tilted to absorb the pressure nonuniformity, and a uniform pressure force can be transmitted to the housing 31a. As a result, the rotor 7 is uniformly pressed against the vibrating member.

Since an anti-rotation portion A and a pin portion 5-b of the bolt for axially supporting the transmission member 33 are present at the same level, a force (side pressure) in the radial direction, which acts on the output gear 8 upon transmission of an output to a transmission gear (not show), does not influence the pressure force.

<Fifth Embodiment>

Figure 15:
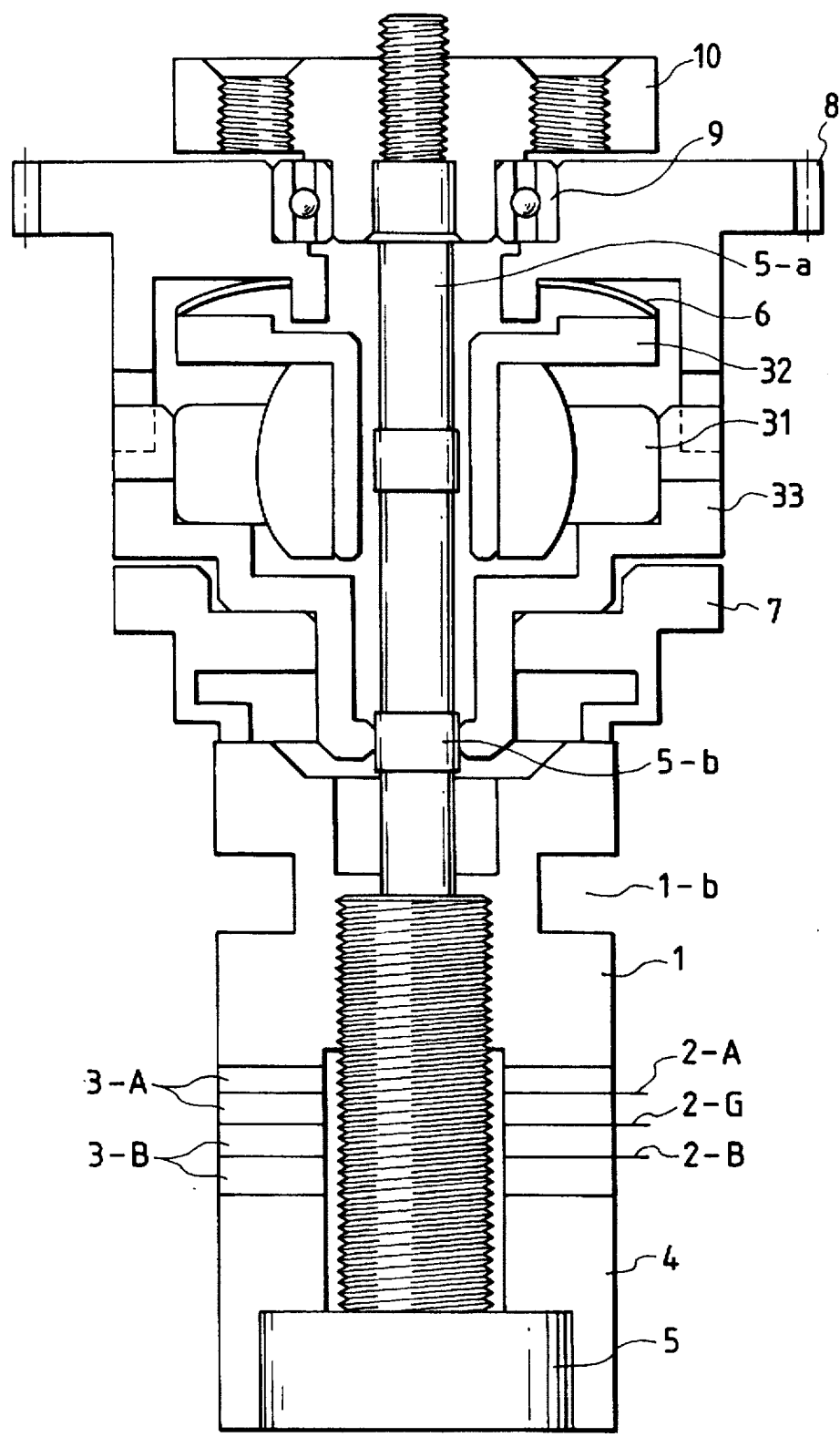
FIG. 15 is a longitudinal sectional view showing a fifth embodiment of the present invention.

FIG. 15 shows a fifth embodiment.

In this embodiment, the spherical bearing 31 is used as in the fourth embodiment shown in FIG. 14. A difference from the fourth embodiment is that the pin portion 5-b of the bolt for axially supporting the transmission member 33 is arranged at the same level as the frictional contact surface between the movable member and the vibrating member. With this arrangement, when the entire surface of the movable member contacts the vibrating member, lateral slip can be prevented.

<Sixth Embodiment>

Figure 16:
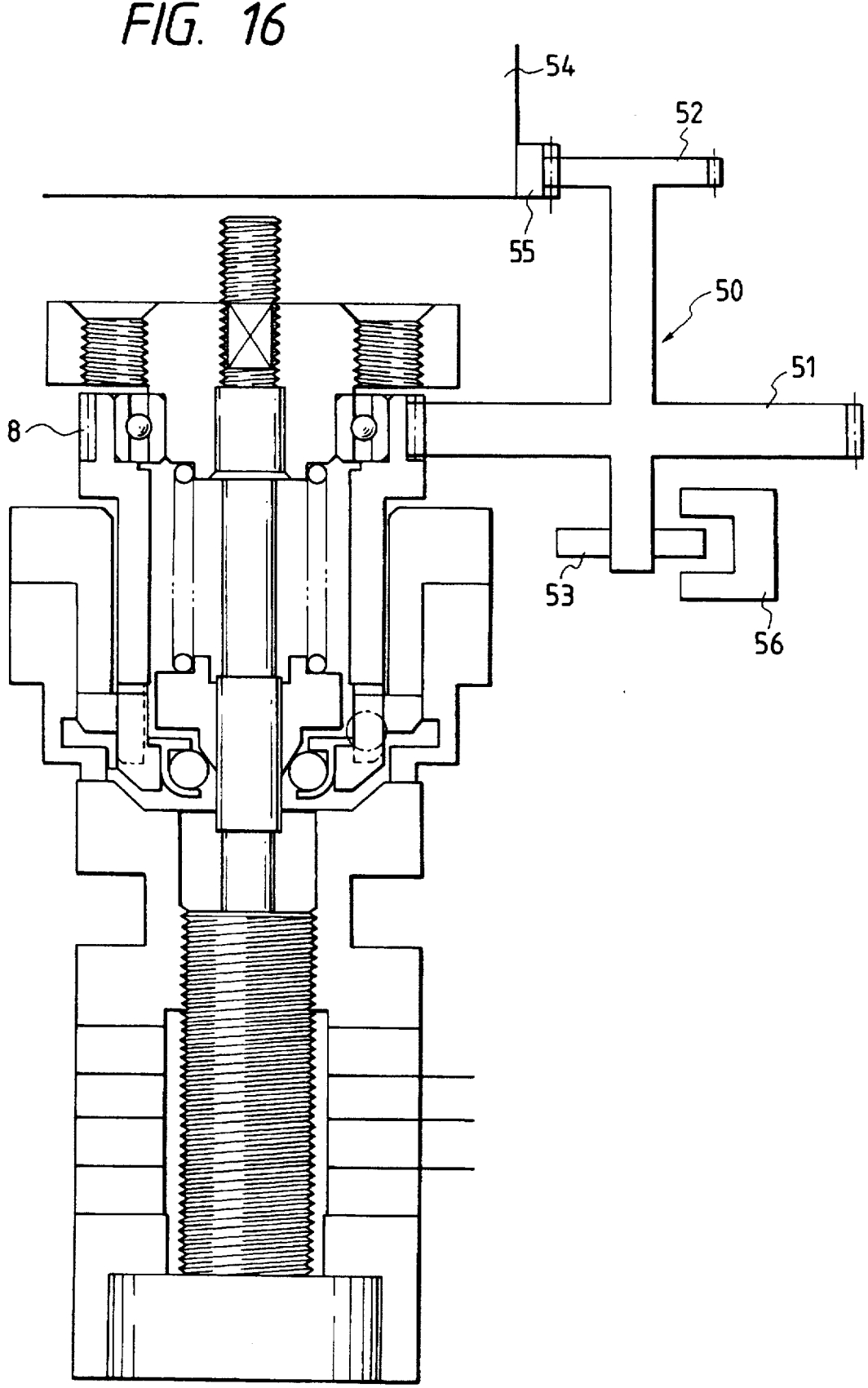
FIG. 16 is a schematic sectional view showing the seventh embodiment of the present invention.

FIG. 16 is a schematic sectional view showing a sixth embodiment.

This embodiment exemplifies an AF driving mechanism of a camera using the ultrasonic wave driven motor of the first embodiment shown in FIG. 1 as a driving motor. A transmission gear 50 coaxially has a large-diameter gear 51, a small-diameter gear 52, and a rotary pulse plate 53. The large-diameter gear 51 meshes with the output gear 8 of the ultrasonic wave driven motor. The small-diameter gear 52 meshes with a gear 55 of a rotary cylinder 54 of a lens barrel so as to transmit the rotational force of the ultrasonic wave driven motor to the rotary cylinder 54, thereby moving a lens. On the other hand, the rotation of the transmission gear 50 is detected by the pulse plate 53 and a photointerrupter 56, and a control circuit (not shown) controls the ultrasonic wave driven motor on the basis of the detection signal so as to execute an AF operation.

AS described above, even when compression means such as a compression spring has poor precision, and its pressure force is not uniform in the circumferential direction, the movable member can be uniformly compressed at a predetermined pressure to follow the vibrating member, and as a result, a stable, high output can be generated.

Since pressure nonuniformity can be absorbed by the transmission member, truly only the pressure force is applied between the movable member and the vibrating member. As a result, wear of the contact surface can be prevented, and the motor efficiency can be improved.

What is claimed is:

1. A vibration wave driven actuator comprising:
   a vibrating member for generating a vibration therein;

a contact member arranged in contact with said vibrating member, said vibration creating relative movement between said vibrating member and said contact member;

an urging member for applying a pressure force between said vibrating member and said contact member;

a supporting member for supporting said contact member for rotation about an axis of the actuator, said contact member being tiltable relative to said supporting member;

a bearing mechanism arranged between said supporting member and said contact member, for accommodating a tilt of said contact member relative to said supporting member; and an output member mounted for rotation about the axis of the actuator, independently of said supporting member for supporting said contact member, and movably engaged with said contact member at a rotation force transmission point, so that a tilt of said contact member is not transmitted to said output member.

2. A vibration wave driven actuator according to claim 1, wherein said supporting member has a fixing member arranged in contact with one end of said urging member, and a member arranged in contact with the other end of said urging member.

3. A vibration wave driven actuator according to claim 2, wherein said urging member includes a coil spring.

4. A vibration wave driven system comprising:

a vibrating member for generating a vibration therein;

a rotary member arranged in contact with said vibrating member, said vibration rotating said rotary member;

an urging member for applying a pressure force between said vibrating member and said rotary member;

a supporting member for supporting said rotary member for rotation about an axis of the system, said rotary member being tiltable relative to said supporting member;

a bearing mechanism arranged between said supporting member and said rotary member, for accommodating a tilt of said rotary member relative to said supporting member;

an output member mounted for rotation about the axis of the system, independently of said supporting member for supporting said rotary member, and rotatably engaged with said rotary member at a rotation force transmission point, said output member and said rotary member engaging each other so that a tilt of said rotary member is not transmitted to said output member; and a driving force transmitting member, rotatably engaged with said output member, for moving a load of said system.

5. A vibration wave driven actuator comprising:

a vibrating member for generating a vibration therein;

a contact member arranged in contact with said vibrating member, said vibration creating relative movement between said vibrating member and said contact member;

an urging member for applying a pressure force between said vibrating member and said contact member; and a supporting member for supporting said urging member, a portion of the supporting member in contact with the urging member being tiltable within a predetermined range in response to a nonuniformity in the pressure force applied by said urging member, said supporting member being independently tiltable relative to said contact member.

6. A vibration wave driven actuator according to claim 1, wherein said bearing mechanism comprises a pivot bearing.

7. A vibration wave driven actuator according to claim 1, wherein said bearing mechanism comprises a spherical bearing.

8. A vibration wave driven system according to claim 4, wherein said bearing mechanism comprises a pivot bearing.

9. A vibration wave driven system according to claim 4, wherein said bearing mechanism comprises a spherical bearing.

10. A vibration wave driven actuator according to claim 1, further comprising a second supporting member for supporting said urging member.

11. A vibration wave driven actuator according to claim 10, wherein said vibration member or said contact member rotates about an axis of rotation, and said second supporting member is movable only in a direction of the axis of rotation.

12. A vibration wave driven system according to claim 4, further comprising a second supporting member for supporting said urging member.

13. A vibration wave system according to claim 12, wherein said rotary member has an axis of rotation, and said second supporting member is movable only in a direction of the axis of rotation of said rotary member.

14. A vibration wave driven actuator according to claim 1, wherein said bearing mechanism is a slide bearing having a tapered portion.

15. A vibration wave driven system according to claim 4, wherein said bearing mechanism is a slide bearing having a tapered portion.

16. A vibration wave driven actuator according to claim 11, wherein said bearing mechanism comprises a pivot bearing.

17. A vibration wave driven actuator according to claim 11, wherein said bearing mechanism comprises a spherical bearing.

18. A vibration wave driven actuator according to claim 11, wherein said bearing mechanism is a slide bearing having a tapered portion.

19. A vibration wave driven system according to claim 13, wherein said bearing mechanism comprises a pivot bearing.

20. A vibration wave driven system according to claim 13, wherein said bearing mechanism comprises a spherical bearing.

* * * * *

UNITED STATES PATENT AND TRADEMARK OFFICE
CERTIFICATE OF CORRECTION

PATENT NO. : 5,739,623  
DATED : April 14, 1998  
INVENTOR(S) : HAJIME KANAZAWA, ET AL.

Page 1 of 2

It is certified that error appears in the above-indentified patent and that said Letters Patent is hereby corrected as shown below:

Column 1

Line 66, "there between by the" should read --therebetween by--.

Column 2

Line 17, "the" should be deleted.
    Line 23, "the" should be deleted.

Column 3

Line 42, "a" (second occurrence) should be deleted.

Column 7

Line 2, "Fi. 21," should read --FIG. 21,--.

UNITED STATES PATENT AND TRADEMARK OFFICE
CERTIFICATE OF CORRECTION

PATENT NO. : 5,739,623
DATED : April 14, 1998
INVENTOR(S) : HAJIME KANAZAWA, ET AL.

It is certified that error appears in the above-identified patent and that said Letters Patent is hereby corrected as shown below:

<u>Column 8</u>

Line 54, "AS" should read --As--.

Signed and Sealed this

Thirteenth Day of October 1998

Attest:

BRUCE LEHMAN

Attesting Officer     Commissioner of Patents and Trademarks